United States Patent [19]

Tarlton, Sr. et al.

[11] Patent Number: 5,002,171
[45] Date of Patent: Mar. 26, 1991

[54] LEVER ADJUSTMENT METHOD

[75] Inventors: James K. Tarlton, Sr., Auburn; Steven L. Dunn, Waterloo, both of Ind.

[73] Assignee: Dana Corporation, Toledo, Ohio

[21] Appl. No.: 516,508

[22] Filed: Apr. 30, 1990

[51] Int. Cl.⁵ ............................................. F16D 13/75
[52] U.S. Cl. ................................................. 192/110 R
[58] Field of Search ............... 192/110 R, 99 A, 70.3; 411/258, 282

[56] References Cited

U.S. PATENT DOCUMENTS

| | | | |
|---|---|---|---|
| 1,981,504 | 11/1934 | Goodwin | 192/110 R |
| 1,985,301 | 12/1934 | Thelander et al. | |
| 2,021,973 | 11/1935 | Wemp | 192/99 A X |
| 2,163,971 | 6/1939 | Zeidler | |
| 3,412,772 | 11/1968 | Meyfarth et al. | 411/282 |
| 3,746,068 | 7/1973 | Deckert et al. | 411/258 |
| 4,131,187 | 12/1978 | Smith et al. | 192/99 A |
| 4,332,314 | 6/1982 | Flotow | 192/89 B |
| 4,503,959 | 3/1985 | Flotow et al. | 192/110 R X |
| 4,601,377 | 7/1986 | Flotow et al. | 192/110 R |
| 4,667,799 | 5/1987 | Kummer | 192/110 R X |

FOREIGN PATENT DOCUMENTS 0194037  8/1987  Japan ................... 192/70.3

Primary Examiner—Rodney H. Bonck
Attorney, Agent, or Firm—F. B. McDonald

[57] ABSTRACT

A method of adjusting a nose portion of a clutch lever includes providing a pair of lever mounting brackets on a clutch cover. The mounting brackets, which control pivotal movement of the tail portion of the lever, have ears which are angularly displaced by a fastener to effect adjustment of the nose portion to a desired position relative to the clutch cover. This procedure permits the use of relatively common hardware without requiring additional expensive or cumbersome apparatus. In one preferred form, the adjustment technique utilized a five inch lever, and provided approximately 0.090 thousandths of an inch of adjustment of the nose end of the lever, with an associated angular displacement of the clutch bracket ears of only 2-5 degrees.

10 Claims, 2 Drawing Sheets

LEVER ADJUSTMENT METHOD

BACKGROUND OF THE INVENTION

This invention relates to methods of adjusting release levers in friction clutches. More particularly, the invention relates to adjustment of lever nose portions by positioning the tail portions of the levers during clutch assembly.

The prior art offers numerous methods for adjusting clutch release levers. Several methods include the use of screws which have heads extending from pressure plates, and which are adjustable along the pressure plate axis of the clutch for movement of the radially outer tail portions of the levers. Other methods include grinding, simultaneously in at least one case, the inner nose ends of a plurality of such levers to assure that all of the lever noses lie within a common plane. Major drawbacks of these standard and/or common techniques are expense and associated handling of extra parts required to be manufactured and installed in the clutches.

SUMMARY OF THE INVENTION

The present invention provides clutch lever adjustment via utilization of a bolt which rotatably secures the tail portion of a lever to a pair of lever support brackets on a clutch cover. Adjustment of each lever is effectively achieved by adjustment of the lateral position of the bolt (the fulcrum of the lever) relative to the axis of the clutch cover. In a preferred method, tightening of the bolt angularly moves the ear portions of the brackets together, resulting in displacement of the bolt, and hence of the tail portion of the lever. A relatively small axial adjustment of the tail results in a larger, hence leveraged, axial adjustment of the nose relative to the cover. Because a swaged pin is generally utilized to secure the lever tail to the pair of brackets, the conventional pin may be simply replaced by a threaded bolt and nut arrangement for practice of the present invention.

An adhesive may be utilized to permanently secure the nut to the threaded end of the bolt after final adjustment. The threads of the nut which engage the bolt may be deformed as well to assure tightness.

DETAILED DESCRIPTION OF A PREFERRED PRACTICE OF THE INVENTION

Figure 1:
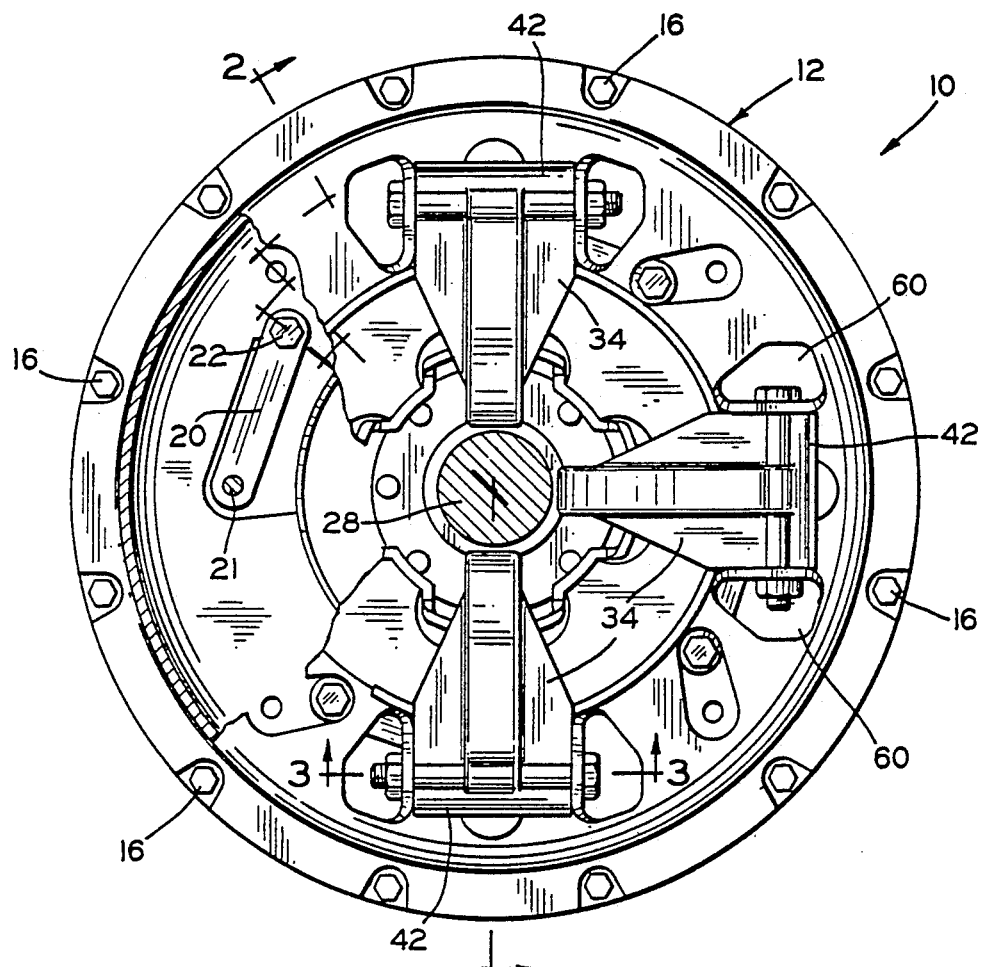
FIG. 1 is a fragmentary elevational view of a clutch assembly, showing a plurality of levers secured by their tail portions to brackets.
Figure 2:
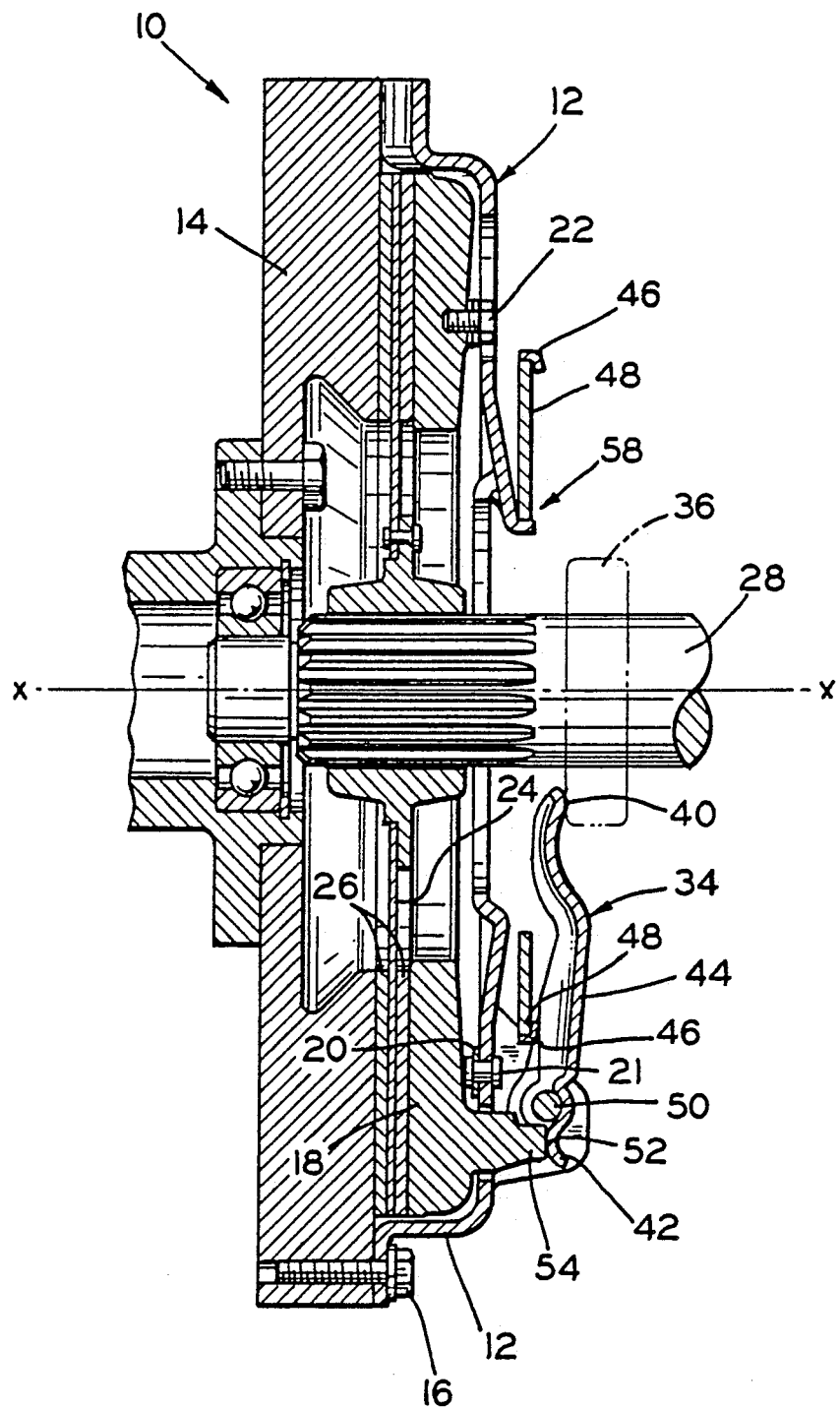
FIG. 2 is a cross-sectional view along lines 2—2 of FIG. 1.

Referring initially to FIGS. 1 and 2, a friction clutch 10 incorporates a cover 12 secured to a flywheel 14 by a plurality of bolts 16. A pressure plate 18 is also secured to the cover 12 by straps 20 attached to the pressure plate 18 by rivets 21 and to the cover 12 by bolts 22. Disposed intermediately of the pressure plate and flywheel members, is a friction disc 24 having friction facings 26 attached to opposite sides of the disc 24. During clutch engagement, a driven shaft 28, splined at 30 to the disc, rotates directly with the flywheel 14.

Those skilled in the art will appreciate that a plurality of clutch release levers 34 are adapted to contact a clutch release bearing 36 (shown in phantom in FIG. 2) to effect clutch engagement and disengagement. Each clutch lever 34 has a nose portion 40 which defines an inner lever end and a tail portion 42 which defines the radially outer end of the lever. The nose portion 40 is adapted to bear continuously against the clutch release bearing, while the tail portion 42 is designed to accommodate passage therethrough of a pin or bolt member 70 secured to the cover 12 for retaining the lever pivotally to the cover. An intermediate or central lever portion 44 engages a collector ring 46, which in turn bears against the lever portion 44 under the force of a Belleville spring 48. Thus, those skilled in the art will appreciate that when the clutch is engaged, the plurality of levers 34 are pivotally rotated about the member 70, and the nose portions 40 are thus moved to and retained in their right-most or clockwise positions (FIG. 2) by the force of the Belleville spring 48.

In order to overcome the normal clutch engagement force, the clutch release bearing 36 is moved leftwardly by the force of a clutch pedal (not shown) against the lever noses 40 to overcome the Belleville force against the collector ring 46. This movement collapses the Belleville spring 48, supported against the immovable clutch cover 12 as shown at 58. The resultant action permits the tail boss 52 of the tail portion 42 to move rightwardly away from a pressure plate boss 54, against which it normally bears during engagement. The pressure plate is thereby freed to move rightwardly away from the friction disc, whereupon the clutch becomes disengaged.

Figure 3:
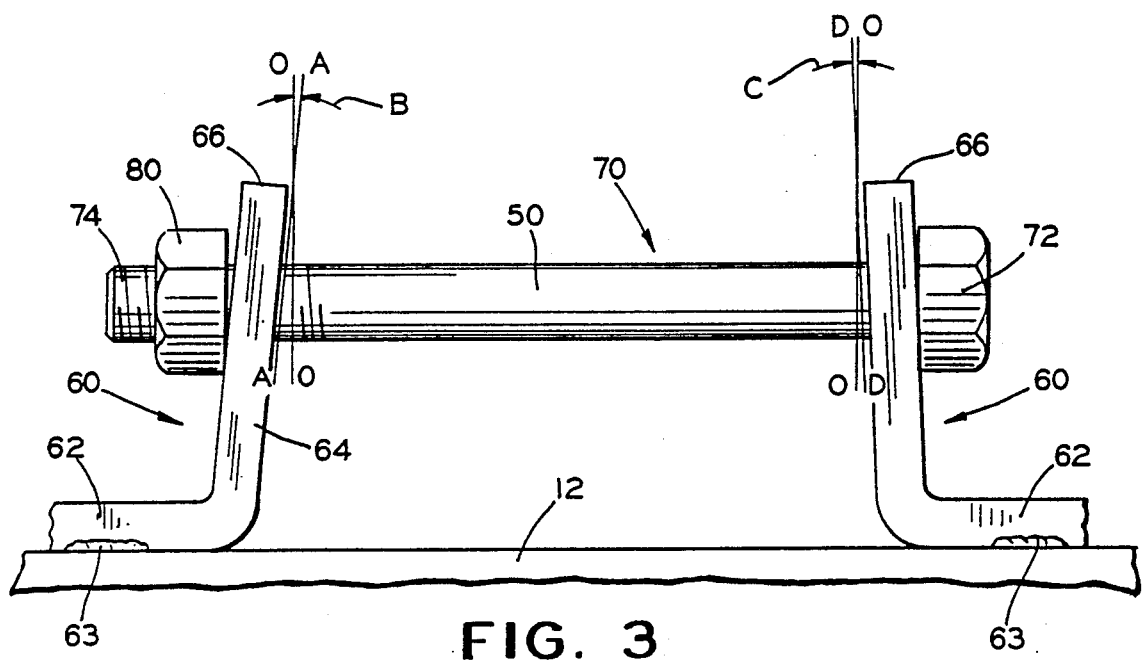
FIG. 3 is a fragmentary partial view of the clutch of FIG. 1, viewed along lines 3—3, but shown without the lever.

Referring now more particularly to FIGS. 1 and 3, it will be appreciated that associated pairs of brackets 60 are utilized to secure individual tail portions 42 of the levers 34 to the cover 12. In the preferred embodiment described, each bracket includes an attachment segment 62 which is connected to the cover by a weld 63, as shown. Alternatively, the segment may be bolted or riveted to the cover. Each bracket includes an upstanding or projecting ear portion 64 (hereinafter called an ear) which is generally orthogonal (perpendicular) to the cover 12 at its point of attachment to the cover. Each ear 64, as shown in FIG. 3, may be adjusted relative to the other of its pair by merely being displaced angularly inwardly from its orthogonal or upstanding position. For this purpose, a bolt 70 is used in place of the pin connection earlier noted, the bolt providing a head 72 which bears against one of the bracket ears, a shaft 50, and a threaded end 74. A nut 80, secured to the threaded end 74, bears against the other bracket ear.

The nut 80 is preferably of a self locking structure (or may alternatively be interiorly deformed) to assure against becoming loosened under conditions of vibration. Also in a preferred form, an adhesive such as an anaerobic sealant (e.g. "LOCKTITE") may be employed to insure that the nut remains securely in place after final adjustment of the lever position.

Those skilled in the art will appreciate that it is desirable that the lever noses 40 simultaneously engage the release bearing 36 under as nearly equal individual forces as possible. This is necessary for most efficient clutch engagement and release, and can be achieved by ensuring that all noses are adjusted to lie in a common plane.

The method of the present invention includes adjustment of each individual lever nose by angularly displacing associated pairs of bracket ears 64 toward one another. For each lever, tightening the nut 80 (FIG. 3) will tend to cock the ears 64 toward each other, the amount of angular displacement being controlled by the amount of tightening of the nut. This invention contemplates that the angle of adjustment will require displacement of each ear by an approximate amount of 2-5 degrees per ear. Thus referring to extremities 66 of the ears 64 as points of reference in FIG. 3, it will be seen that the left ear 64 moves from the orthogonal line O—O to an angle B to coincide with the non-vertical line A—A. Simultaneously, the right ear 64 will move angularly, leftwardly from its normally orthogonal position parallel to O—O, to the angle C to become parallel with the line D—D. In most situations, the angles B and C will not be equal, but will be relatively close, and the difference will not affect the precision of the lever nose adjustment relative to the clutch release bearing 36.

In the practice of the present invention, the levers are adjusted prior to installation of the Belleville spring 48 and the collector ring 46. Prior to adjustment, a fixed reference is established against which the individual nose adjustment of each lever can be measured. For this purpose, the tail boss 52 of each lever is rotated to, and held rigidly against, its associated pressure plate boss 54. This operates to secure the lever 34 in its clockwise-most position while the fulcrum (bolt 70) is shifted laterally toward the cover to achieve desired position of the nose 40.

EXAMPLE

A 5 inch lever was utilized, and was determined to provide an approximate "7-1" leverage adjustment ratio between tail and nose portions. The required total adjustment range of axial deflection was 0.090 thousandths of an inch at the nose. Angular deflection at the ears was within a range of 2-5 degrees. The method of adjusting the nose end of the lever was carried out as follows:

Step A—A pair of spaced lever mounting brackets were provided, and were secured to the clutch cover.

Step B—The tail portion of a lever was placed between the brackets, and a bolt was extended through the tail portion until the head of the bolt contacted one of the brackets, and its threaded end protruded through the other of the two brackets.

Step C—The tail boss of the lever was next rotated to and held rigidly against its associated pressure plate boss.

Step D—A deformed nut was installed over the threaded end of the bolt and was tightened against the ear with which it made contact, until the nose portion of the lever was adjusted to a desired position relative to the cover.

The deformed nut which was utilized included a slightly non-cylindrical interior threaded portion sized to provide a tight fit over the cylindrical threaded exterior end of the bolt. More specifically, in the immediate example, the internal non-cylindrical threaded portion of the nut was oval in shape. Finally, an adhesive sealant was applied to the interstices between the deformed nut and threaded shaft portion of the bolt.

Although only one preferred method is described herein, the following claims envision other methods which will fall within their spirit and scope.

What is claimed is:

1. A method of adjusting a first end of a clutch lever relative to a clutch cover, said first end defining a nose portion, wherein a second end of said lever is pivotally affixed to said cover, said second end defining a tail portion, said method comprising the steps of:
   (a) providing a pair of lever mounting brackets spaced upon and secured to the clutch cover, said brackets defining ears comprising upstanding portions extending generally orthogonally to the cover,
   (b) providing means secured to each ear for pivotally supporting said tail portion of said lever, and
   (c) providing means for angularly displacing said ears toward and away from one another, whereby said nose portion may be adjusted to a desired position relative to said cover.

2. The method of claim 1 of adjusting said nose portion of said lever, wherein said ears are integrally affixed to said cover.

3. The method of claim 2 of adjusting said nose portion of said lever wherein said means secured to each ear for support of said tail portion is an elongate member extending between each ear.

4. The method of claim 3 of adjusting said nose portion of said lever wherein said means for support of said tail portion comprises a bolt having a cylindrical threaded end portion.

5. The method of claim 4 of adjusting a nose portion of said lever wherein said means for angularly displacing said ears toward and away from one another comprises a nut adapted for threaded engagement with said bolt.

6. The method of claim 5 of adjusting said nose portion of said lever wherein said nut defines a non-cylindrical threaded portion.

7. The method of claim 6 of adjusting said nose portion of said lever, wherein said threaded portion is oval for making a tight connection with said threaded portion of said bolt.

8. The method of claim 4 of adjusting a nose portion of a clutch lever further including a final step of applying an adhesive to the interstices between the nut and said threaded portion of said bolt.

9. The method of claim 3 of adjusting said nose portion of said lever, wherein said means secured to each ear for support of said tail portion comprises an elongate pin having threads on its ends, there being a nut secured to each end of said pin.

10. The method of claim 5 of adjusting a nose portion of a clutch lever wherein said nut is a self-locking nut.

* * * * *